(12) United States Patent
Schmoetzer (10) Patent No.: US 11,200,068 B2
(45) Date of Patent: Dec. 14, 2021

(54) METHODS AND DEVICES FOR THE AUTOMATIC CONFIGURATION OF AN EXCHANGE FIELD DEVICE IN A PROCESS CONTROL SYSTEM

(71) Applicant: Bürkert Werke GmbH & Co. KG, Ingelfingen (DE)

(72) Inventor: Ralf Schmoetzer, Hohebach (DE)

(73) Assignee: Bürkert Werke GmbH & Co. KG

(*) Notice: Subject to any disclaimer, the term of this patent is extended or adjusted under 35 U.S.C. 154(b) by 129 days.

(21) Appl. No.: 16/223,231

(22) Filed: Dec. 18, 2018

(65) Prior Publication Data
US 2019/0188008 A1    Jun. 20, 2019

(30) Foreign Application Priority Data
Dec. 19, 2017 (EP) .................................. 17208608

(51) Int. Cl.
*G06F 9/445* (2018.01)
*G05B 19/042* (2006.01)

(52) U.S. Cl.
CPC ..... *G06F 9/44505* (2013.01); *G05B 19/0426* (2013.01); *G05B 2219/25061* (2013.01);
(Continued)

(58) Field of Classification Search
None
See application file for complete search history.

(56) References Cited

U.S. PATENT DOCUMENTS

| 6,738,388 B1* | 5/2004 | Stevenson | G05B 19/4185 370/410 |
| 2004/0153594 A1* | 8/2004 | Rotvoid | G05B 19/4186 710/305 |

(Continued)

FOREIGN PATENT DOCUMENTS

DE    102009028655 A1    2/2011

OTHER PUBLICATIONS

Lars Duerkop et al. "Towards Autoconfiguration of Industrial Automation Systems: A Case Study Using Profinet 10". Institute Industrial IT, Ostwestfalen-Lippe University of Applied Sciences. NPL. Sep. 21, 2012. pp. 1-8.

(Continued)

*Primary Examiner* — Fahmida Rahman
(74) *Attorney, Agent, or Firm* — Carlson, Gaskey & Olds, P.C.

(57) ABSTRACT

A method provides for the automatic configuration of a field device in a process control system. The process control system comprises one or more field devices and a configuration provider. The field devices and the configuration provider are communicatively coupled via a communication system. The method comprises: the automatic retrieval and provision of configuration data of the field devices via the configuration provider; the automatic recognition of the field device via the configuration provider after the removal of a second field device from the process control system and the replacement with the field device; and the automatic configuration of the field device using the provisioned configuration data of the second field device via the configuration provider. The method further comprises the recurrent sending of an introducing message from the configuration provider to the field devices to introduce the configuration provider to the field devices. The method further comprises (Continued)

the registration of the field devices with the configuration provider.

9 Claims, 6 Drawing Sheets

(52) U.S. Cl.
CPC .............. *G05B 2219/25081* (2013.01); *G05B 2219/25428* (2013.01)

(56) References Cited

U.S. PATENT DOCUMENTS

| | | | | |
|---|---|---|---|---|
| 2007/0250180 | A1* | 10/2007 | Bump | G05B 19/41845 700/1 |
| 2008/0303472 | A1* | 12/2008 | John | G05B 19/0426 318/568.2 |
| 2014/0046618 | A1* | 2/2014 | Arunachalam | G05B 19/0428 702/127 |
| 2015/0105871 | A1 | 4/2015 | Ochsenreither | |
| 2016/0182693 | A1* | 6/2016 | Ferguson | H04L 69/26 709/217 |
| 2016/0291563 | A1* | 10/2016 | Kumar | H04L 67/125 |

OTHER PUBLICATIONS

Oct. 11 et al: "Session: 7 Autokonfiguration von Multiprotokoll-I/O Modulen nach einem Gerätetausch (TURCK Electronics)", Oct. 11, 2017 (Oct. 11, 2017), XP055457699, Gefunden im Internet: URL:https:// www.its-owl.de/fileadmin/PDF/Veranstaltungen/2017/Transfertag/ 7A_ Turck-Electronics.PDF [gefunden am Mar. 8, 2018].

Extended European Search Report for European Application No. 17208608.4 dated Jun. 5, 2018.

\* cited by examiner

| | L1 | | | L2 | |
|---|---|---|---|---|---|
| | IDNR | SNR | | IDNR | SNR |
| A | I | 1 | A | I | 1 |
| B | II | 1 | B | II | 1 |
| D | II | 2 | D | II | 2 |
| C | II | 3 | C | II | 3 |

Fig. 4b

| | L1 | | | L2 | |
|---|---|---|---|---|---|
| | IDNR | SNR | | IDNR | SNR |
| A | I | 1 | A | I | 1 |
| B | II | 1 | B | II | 1 |
| D | II | 2 | D | II | 2 |
| C | II | 3 | C | II | 3 |
| | | | F | III | 7 |

Fig. 4c

| | L1 | | | L2 | |
|---|---|---|---|---|---|
| | IDNR | SNR | | IDNR | SNR |
| A | I | 1 | A | I | 1 |
| B | II | 1 | B | II | 1 |
| D | II | 2 | D | II | 2 |
| C | II | 3 | C | II | 3 |
| F | III | 7 | F | III | 7 |

Fig. 4d

| | L1 | | | L2 | |
|---|---|---|---|---|---|
| | IDNR | SNR | | IDNR | SNR |
| A | I | 1 | A | I | 1 |
| B | II | 1 | B | II | 1 |
| D | II | 2 | C | II | 3 |
| C | II | 3 | F | III | 7 |
| F | III | 7 | X | II | 4 |

Fig. 4e

| | L1 | | | L2 | |
|---|---|---|---|---|---|
| | IDNR | SNR | | IDNR | SNR |
| A | I | 1 | A | I | 1 |
| B | II | 1 | B | II | 1 |
| D | II | 4 | C | II | 3 |
| C | II | 3 | F | III | 7 |
| F | III | 7 | D | II | 4 |

FIG. 5

METHODS AND DEVICES FOR THE AUTOMATIC CONFIGURATION OF AN EXCHANGE FIELD DEVICE IN A PROCESS CONTROL SYSTEM

CROSS-REFERENCE TO RELATED APPLICATIONS

This application is a U.S. non-provisional application claiming the benefit of European Application No. 17 208 608.4, filed on Dec. 19, 2017, which is incorporated herein by herein in its entirety.

FIELD OF INVENTION

The invention relates to a method for the automatic configuration of an exchange field device in a process control system via a configuration provider. Furthermore, the invention relates to an appropriate configuration provider, an appropriate automatically configurable field device, and to a system having a configuration provider and one or more automatically configurable field devices which are designed to execute the method.

TECHNICAL BACKGROUND

Field devices are technical devices in the field of automation engineering. Field devices comprise actuators (such as valves, setting elements, motors) and sensors (such as flowmeters, temperature measuring sensors, pH sensors).

The field devices are usually connected to a pilot and control system. The field devices and the pilot and control system together form a process control system. The communication between the field devices and the driving and control systems usually runs via a field bus. In the meantime, other network technology such as Industrial Ethernet and in particular real-time capable Ethernet is however increasingly used instead of a field bus.

In industrial plants, a process is in this way monitored, open-loop and closed-loop controlled by the control and guidance system. The sensors determine controlled variables such as temperature, pressure and flow. The field device then transmits these controlled variables via a field bus or another communication channel to the pilot and control system. On the basis of the controlled variables, the latter then determines manipulated variables using process-specific requirements, which are transmitted to the field devices, in particular to the actuators. The actuators act on the open-loop or closed-loop controlled production process in accordance with the manipulated variables.

SUMMARY OF THE INVENTION

It is an object of the invention to provide a method for the automatic configuration of an exchange field device in a process control system. It is a further object of the invention to provide an appropriate configuration provider, an appropriate automatically configurable field device, and a system having a configuration provider and one or more automatically configurable field devices which are designed to execute the method according to the invention. Further objects will result from the following descriptions.

According to one aspect of the invention, a method is provided for the automatic configuration of an exchange field device in a process control system. The process control system can comprise one or more field devices and a configuration provider.

The field devices and the configuration provider can be communicatively coupled via a communication system. To this end, the field devices and the configuration provider can include appropriate interfaces. The communication system can be a fieldbus. The fieldbus can preferably be a CAN open-based fieldbus, in particular a Bürkert System Bus (büS). Alternatively, the communication system can be an Industrial Ethernet, in particular a real-time capable Ethernet. A fieldbus often offers simple cabling and robust communication. An Ethernet has advantages concerning speed.

An exchange field device is a first field device which is integrated into the process control system as a replacement for a second field device. The second field device was previously integrated in the process control system and has assumed a specific function within the process control system. For the exchange, the second field device is removed from the process control system and the first field device is inserted and connected in the place of the second field device in the process control system. After the automatic configuration of the first field device using the configuration data of the second field device, the first field device completely replaces the second field device in the process control system from a functional point of view.

According to a further aspect, the method may comprise the automatic retrieval and provisioning of configuration data of the respective field devices. The configuration provider can be designed to retrieve and provision the configuration data from the field devices. The field devices may be designed to transmit their configuration data to the configuration provider on request.

According to a further aspect, the method may comprise the automatic recognition of the first field device as an exchange field device. The first field device can be recognized (by the configuration provider) as an exchange field device after the removal of a second field device from the process control system and the replacement with the first field device.

According to a further aspect, the method may comprise the automatic configuration of the first field device using the provisioned configuration data of the second field device. The configuration provider can be designed to configure the first field device using the provisioned configuration data of the second field device. The field devices may be designed to receive configuration data from the configuration provider and to be configured by the configuration provider using the received configuration data.

According to a further aspect, the method may comprise the recurrent sending of an introducing message. The introducing message can be used to introduce the configuration provider to the field devices. The configuration provider may be designed to send a recurring introducing message to the field devices to introduce itself. The field devices can be designed to receive an introducing message from the configuration provider. Upon reception of an introducing message, the field devices can switch from a standby mode to the active operation.

The above aspects enable automatic configuration of exchange field devices in a simple and efficient way.

The introducing message can be a message to all field devices, i.e. a so-called broadcast message. A broadcast message reaches all participants of a communication system without the participants having to be explicitly specified as recipients. A recipient of a broadcast message can decide for itself whether and how it further processes the broadcast message or whether it rejects the broadcast message. The configuration provider can thus also address unknown field devices.

According to a further aspect, the method may comprise the registration of the field devices with and by the configuration provider. The field devices may be designed to send a message to the configuration provider to register with the configuration provider. The message can contain identification data of the respective field device. The configuration provider may be designed to register field devices which answer the configuration provider. This enables an efficient and resource saving communication.

According to a further advantageous aspect, the method may comprise the sending of a registration request to the field devices such that the field devices register with the configuration provider. The configuration provider may be designed to send the registration request to the field devices. The field devices may be designed to register with the configuration provider after having received the registration request. This aspect permit a simple detection of missing field devices.

According to a further advantageous aspect, the method may comprise the provisioning and maintenance of a first list of identification data of known field devices. The known field devices can be field devices which are currently registered and/or were in the past registered with the configuration provider. The configuration provider can be designed to provision and maintain the first list. The management of the field devices in lists is resource-saving and comparatively undemanding concerning the technical requirements.

The term "list" is not to be understood as a limitation to a specific data structure (e.g. linked lists). The lists can also be arrays, heaps and hash tables, for example. Also, complex data structures and entire databases can be interpreted as a list. Each of the data structures has its own advantages and disadvantages, which have to be weighed up depending on the intended use.

According to a further advantageous aspect, the method can comprise the provisioning and maintenance of configuration data which belong to the known field devices of the first list. The configuration provider can be designed to provision and maintain configuration data belonging to the known field devices of the first list. In other words, a backup of the most recent configuration data can be stored by the configuration provider for each field device listed in the first list. The configuration data can be provisioned in a local storage of the configuration provider or in a remote/distributed storage. This permits the automatic configuration of exchange field devices using the configuration data of the replaced field device.

According to a further advantageous aspect, the identification data of the field devices can comprise an ident number and a serial number. The ident number can correspond to a function-dependent device class of the respective field device. The serial number can be nonrecurring within the respective device class. Further identification data, in particular as to firmware/software versions and/or hardware variants can be used in addition to the ident number and the serial number. This aspect permits a very simple detection of compatible exchange field devices.

According to a further advantageous aspect, the method can comprise the provisioning and maintenance of a second list of identification data of active field devices. The active field devices can be field devices which are currently registered with the configuration provider. The configuration provider can be designed to provision and maintain the second list. The management using lists is resource-saving and efficient.

According to a further advantageous aspect, the method may comprise the filling of the second list with the identification data of the registering field devices. The configuration provider can be designed to fill the second list with the identification data of the field devices that register with the configuration provider.

According to a further advantageous aspect, the method may comprise the recompiling or emptying of the second list. The configuration provider may be designed to compile or empty the second list if the field devices were requested by a registration request to register with the configuration provider. This aspect permits the simple detection of missing field devices.

According to a further advantageous aspect, the method may comprise the comparison of the first list with the second list. A missing (removed) field device can be detected due to the comparison. A field device is recognized as a missing field device if the associated identification data is present only in the first list and not in the second list. The configuration provider may be designed to compare the first list with the second list for this purpose. The comparison of the lists is a very simple and efficient way to detect missing field devices.

According to a further advantageous aspect, the method may comprise the comparison of the second list with the first list. A new field device can be recognized due to the comparison. A field device is recognized as a new field device if the associated identification data is present only in the second list and not in the first list. The configuration provider may be designed to compare the second list with the first list for this purpose. The comparison of the lists is a very simple and efficient way to recognize new field devices.

According to a further advantageous aspect, the method may comprise the automatic recognition of a new field device as the first field device and a missing field device as the second field device, in particular via the configuration provider. The second field device is then recognized as the replaced field device and the first field device as the exchange field device. A condition for this may be that the new field device and the missing field device are the only field devices belonging to a common device class. In this way, an automatic assignment between the replaced field device and the exchange field device is achieved.

According to a further advantageous aspect, a message can be output if several missing field devices having the same ident number are present and/or if several unknown field devices having the same ident number are present. A manual assignment of exchange field devices to replaced field devices can then take place. This aspect covers the case in which the assignment is not unambiguous.

According to a further advantageous aspect, the method may comprise the transmission of the provisioned configuration data of the second field device into the first field device. The configuration provider can be designed to transmit the provisioned configuration data of the second field device into the first field device. The field device can be designed to retrieve the configuration data which were made available.

According to a further advantageous aspect, the method may comprise the configuration of the first field device using the configuration data transmitted to the first field device. The configuration provider can be designed to automatically configure the first field device in this way. This aspect enables the automatic configuration of the exchange field devices.

According to a further advantageous aspect, the method may comprise the replacement of the identification data of the second field device in the first list with the identification data of the first field device. The configuration provider may be designed to replace the identification data of the second field device in the first list with the identification data of the first field device. This aspect simplifies the detection of missing field devices and minimizes the storage requirement.

According to a further advantageous aspect, the method may comprise the transmission of configuration data from a new field device to the configuration provider. Advantageously, the configuration data is only transmitted if the new field device does not replace a missing field device. The configuration provider can be designed to retrieve the configuration data from a field device. This enables the automatic configuration of exchange field devices.

According to a further advantageous aspect, the method may comprise the transmission of configuration data from a field device to the configuration provider. Advantageously, the configuration data are transmitted after having been updated/changed on the field device. The configuration provider can be designed to retrieve the configuration data from a field device. The field devices can be designed to make changes to their own configuration data known to the configuration provider. In this way, the provisioned configuration data is always up to date.

According to a further advantageous aspect, the method may comprise the storing of the configuration data transmitted to the configuration provider in a local storage of the configuration provider or in a remote/distributed storage. The configuration provider may be designed to provision the retrieved configuration data in a local storage of the configuration provider or in a remote and/or distributed storage. The remote storage can be provided by another participant of the communication system, in particular by another field device. Advantageously, the configuration data can be stored in a way distributed to several field devices. Advantageously, the configuration data of a field device can then be stored (completely or proportionally) on one or more other field devices. Due to the remote and/or distributed storage, the storage requirement in the individual field devices and in particular for the configuration provider is comparatively low. A multiple storage increases availability through redundancy.

According to a further advantageous aspect, the method may comprise the insertion of the identification data of the new field device into the first list, in particular via the configuration provider. According to a further advantageous aspect, the configuration provider can be designed to assign the corresponding provisioned configuration data to the identification data in the first list. This permits a simple configuration of an exchange field device using the configuration provider.

According to a further aspect of the invention, a configuration provider for a process control system is provided. The configuration provider may be designed to automatically configure an exchange field device in the process control system having one or more field devices. The configuration provider may be designed to execute the method according to the invention in cooperation with the field devices. Many aspects and advantages of the configuration provider have already been described and will also be described in connection with the method according to the invention.

According to an advantageous aspect, the configuration provider can execute the method according to the invention and in particular the configuration of the exchange field device fully automatically and autonomously (at least in a normal case). In other words, the method can be executed by the configuration provider without any master, i.e. without a higher-level bus master. A manual configuration of the exchange field device, for example by service personnel directly at the field device or using a configurator tool of a higher-level control system, is therefore usually no longer necessary.

According to a further advantageous aspect, the configuration provider can be any field device or a gateway. The functions of the configuration provider can be implemented as software routines (e.g. in the firmware) of the field device or of the gateway. This enables the automatic configuration of exchange field devices without significant additional costs.

According to a further advantageous aspect, information from the configuration provider (for example the first and second lists) can be represented in a display. The display can be located on any field device or gateway which is connected to the bus system. The configuration provider can be operated via the display using a graphical user interface.

According to a further aspect of the invention, an automatically configurable field device is provided. The field device can be designed for the integration into a process control system having a configuration provider. Many aspects and advantages of the field device have already been described and will also be described in connection with the method according to the invention.

According to an advantageous aspect, the field device can include a configuration agent. The configuration agent may be designed to execute the method according to the invention. The configuration agent works as a client and communicates with the configuration provider.

According to an advantageous aspect, the field device can wait a predetermined period of time after its registration with the configuration provider for an action (response) of the configuration provider. The field device may be designed to output a maintenance message if an action of the configuration provider does not appear or if the action fails. The field device may, for example, include an optical or an acoustic signal transmitter. The maintenance message may comply with the NAMUR specification. Maintenance messages can advantageously be made perceptible as (NAMUR) color values of an illuminated display.

According to an advantageous aspect, a signal transmitter can be assigned to each field device. The signal transmitter is advantageously directly connected to the field device or attached thereto. Therefore, the signal transmitter can advantageously be arranged at the location of the field device. The signal transmitter can for example be an optical signal transmitter, such as a light ring, a light strip, a signal tower (multiple light), (colored) LEDs or a display. The signal transmitter can also be an acoustic signal transmitter. Mixed forms are also possible, for example a multiple luminaire having an integrated sound generator module. Other forms of signal transmitters are also conceivable, such as those that give haptic feedback (vibration modules) or, for example, a web server which provides display information but does not display this information on its own. However, the respective signal transmitter is preferably unambiguously and directly assigned to a single field device, in particular directly connected or attached thereto. Therefore, optical signal transmitters in the form of luminous elements (e.g. LEDs etc.) are particularly advantageous.

According to an advantageous aspect, the field device can be designed to deactivate the configuration agent after the output of a maintenance message. This ensures that maintenance takes place when this is necessary.

According to an advantageous aspect, the field device can be designed to monitor its own configuration data as to changes and the communication system as to a registration request in a basic state. This aspect simplifies communication between the field devices and the configuration provider.

According to a further aspect of the invention, a system having a configuration provider and one or more automatically configurable field devices is provided. The configuration provider can be a configuration provider according to aspects of the invention. The automatically configurable field devices can be automatically configurable field devices according to aspects of the invention. The system may be designed to execute the method for the automatic configuration of an exchange field device in a process control system. The system simplifies and shortens the exchange of field devices in a process control system.

BRIEF DESCRIPTION OF THE DRAWINGS

The features and aspects of the invention will be explained in detail below on the basis of example embodiments and with reference to the figures which show.

DETAILED DESCRIPTION

FIG. 1a to FIG. 1e show a sequential simplified schematic representation of a process control system 1 having several field devices FD A to FD X and a configuration provider CP. The field devices FD A to FD X and the configuration provider CP are communicatively coupled via a communication system 2. The communication system 2 is a fieldbus. Alternatively, the communication system can also be an Industrial Ethernet or another form of network.

The configuration provider CP is a field device FD E. Alternatively, the configuration provider can also be implemented by another participant of the communication system 2, the other participant being not a field device FD A to FD X. The configuration provider can also be implemented by another participant of the communication system 2. In particular, a gateway GW of the fieldbus 2 can be designed as a configuration provider CP. The configuration provider CP can also be a participant of the communication system 2 which does not have a double function, i.e. that is neither a field device FD A to FD X nor a gateway. The configuration provider CP can then be integrated at any point in the process control system 1 as an additional participant.

The functions of the configuration provider CP are implemented as software routines in the firmware of a host system, here the field device FD E. The functions of the configuration provider are in particular explained in more detail with reference to FIG. 2.

The field devices FD A to FD X comprise a controller having a configuration agent. The functions of the configuration agent are implemented as software routines in the firmware of the field devices. The functions of the configuration agent are in particular explained in detail with reference to FIG. 3.

The functions of the configuration provider (CP/provider) and of the configuration agents (clients) of the field devices FD A to FD X interact with each other and complement each other in order to execute the method.

If a field device FD E is designed as a configuration provider CP, the field device FD E simultaneously also has the functionality of the configuration provider (Provider) in addition to the normal functionality of the field device as sensor and/or actuator.

For redundancy purposes, more than one configuration provider CP can be active in a process control system. The configuration providers CP can then simultaneously also have the functionality of a configuration agent (client). The configuration providers CP can be active independently of each other and execute the method according to the invention using the field devices FD A to FD X. Alternatively, a first configuration provider CP can be active, while another (passive) configuration provider only provisions the configuration data of the active configuration provider CP and monitors the active configuration provider CP. In the event of a fault of the active configuration provider CP or of the host system thereof, a corresponding exchange field device can be configured by the passive configuration provider and take over the function of the configuration provider CP or of the host system FD E thereof. Alternatively, another (passive) configuration provider can be in direct communication with the active configuration provider CP and mirror the data and settings thereof. In case of an error of the active configuration provider CP, the former passive configuration provider can work as an active configuration provider CP.

The software routines of the configuration provider CP (provider) and/or of the configuration agents (clients) of the field devices FD A to FD X can be directly integrated in the firmware. Alternatively, the software routines of the configuration provider CP and/or of the configuration agents of the field devices FD A to FD X can also be stored in a storage (area) other than the firmware and/or can for example be reloaded from the communication system 2 without deviating from the idea of the invention.

Figure 1A:
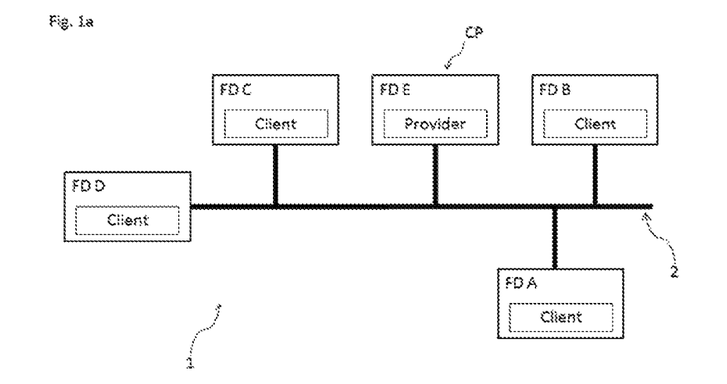
FIG. 1a to FIG. 1e show a sequential simplified schematic representation of a process control system including field devices and a configuration provider.

In FIG. 1a, the field devices FD A, FD B, FD C and FD D are connected in the shown part of the process control system 1. The process control system 1 also includes a configuration provider CP, which is also connected to the fieldbus 2. In the case shown, the functionality of the configuration provider CP is implemented in the field device FD E.

The field devices FD A to FD X are designated in accordance with their functionality in the process control system 1. This means that each field device of the field devices FD A to FD X fulfils a specific function (A to X) in the process control system 1. If a new field device FD X has the same function as an old field device FD D after a field device exchange and a subsequent configuration, the new field device FD X is also given the same designation as the old field device FD D and is referred to as the exchange field device FD D.

Figure 1B:
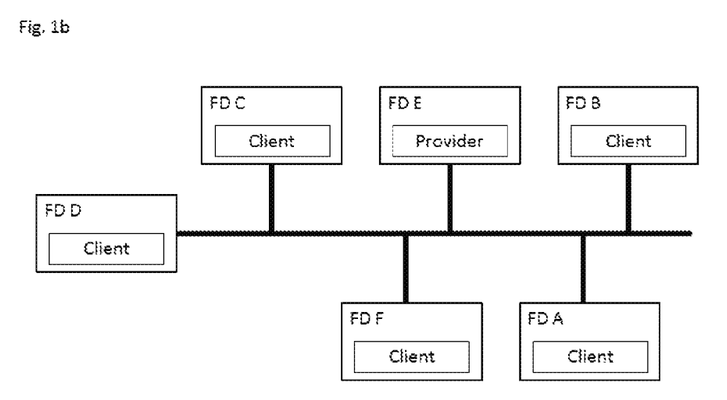

In FIG. 1b, a further field device FD F is connected to the fieldbus 2. The field device FD F is a new field device if it was not previously (here in FIG. 1a) connected to the fieldbus 2. If the field device FD F was already connected to the fieldbus 2 and registered by the configuration provider CP in the past, the field device FD F is a new known field device. If the field device FD F was not previously connected to the fieldbus 2 and if it was not previously registered by the configuration provider CP, the additional field device FD F is a new unknown field device. Since in the case shown no other field device has been removed before, the other field device FD F is not an exchange field device.

Figure 1C:
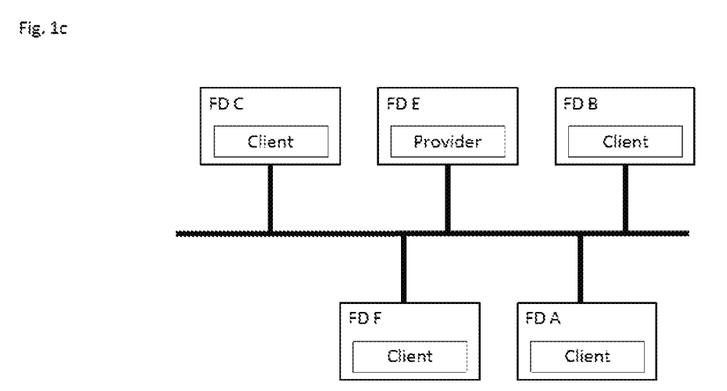

In FIG. 1c, the field device FD D was removed from the process control system 1. It is not absolutely necessary that the field device FD D is physically removed from the process control system 1. The field device FD D can also be switched off or defective.

Figure 1D:
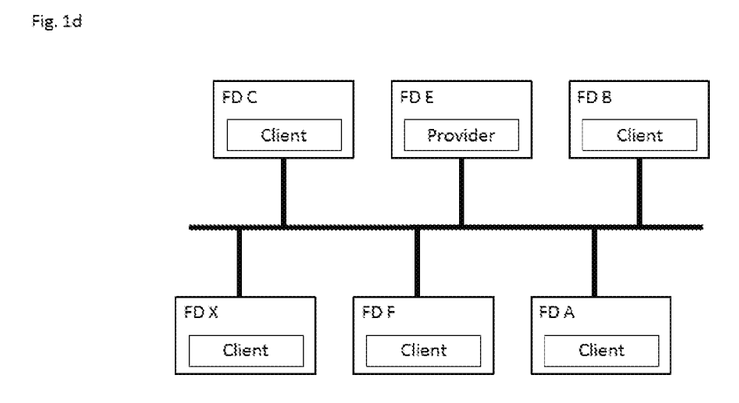

In FIG. 1d, the now removed field device FD D has been replaced by a new field device FD X. The field device FD X is not yet configured directly after integration into the process control system 1. The field device FD X therefore only has a basic functionality and cannot yet completely replace the previously removed field device FD D from a functional point of view. For this reason, the field device is referred to as field device FD X in FIG. 1d, and not already as field device FD D.

Figure 1E:
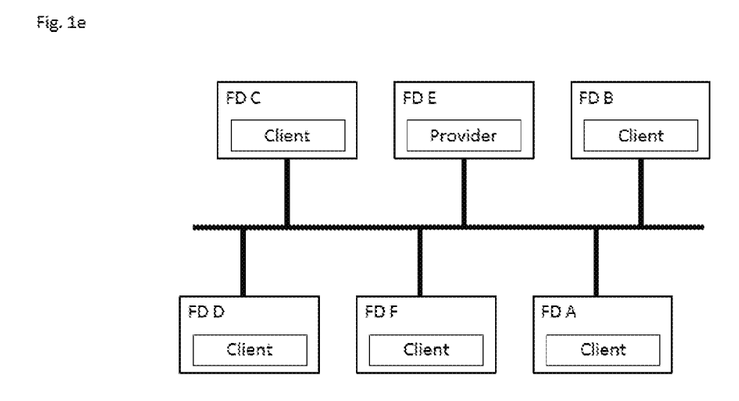

In FIG. 1e, the field device FD X has in the meantime been recognized by the configuration provider CP as an exchange field device for the field device FD D. The field device FD X was then configured by the configuration provider CP using the configuration data of the field device FD D provisioned by the configuration provider CP. The field device with the former designation FD X completely takes over the function of the former or removed field device FD D after the configuration by the configuration provider CP. The field device FD X of FIG. 1d is therefore referred to as field device FD D in FIG. 1e.

A condition for the configuration is that the configuration provider CP provisions configuration data of the field devices FD A to FD D and FD F in the process control system 1. To this end, the configuration provider CP automatically retrieves the respective configuration data from the field devices of the process control system 1.

Figure 2:
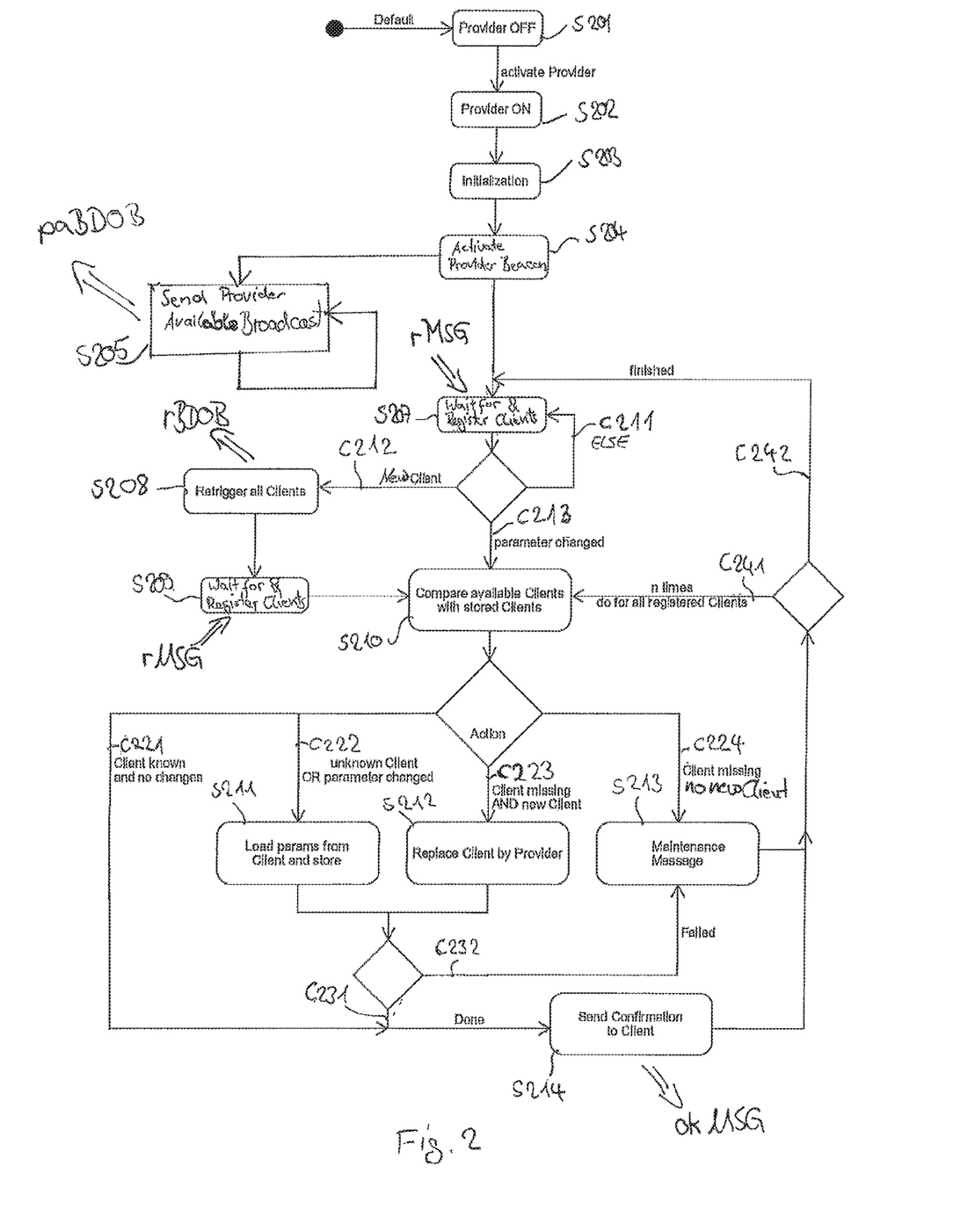
FIG. 2 shows a simplified state diagram of a configuration provider.

FIG. 2 shows a simplified state diagram of a configuration provider CP.

The steps of the method according to the invention are grouped into successive states ("States", prefix S2xx) and described in the context of these states. Usually, a first state is followed by exactly one second state. In alternatives, the second state is selected from a limited number of predetermined states depending on the fulfillment of a condition ("Conditionals", prefix C2xx). State S204 is an exception to the above rule. A real branching takes place in this state. State S204 is followed by states S205 and S207 in a substantially parallel and henceforth independent sequence.

In an initial state S201, the configuration provider CP is deactivated on the host system (e.g. the field device FD E or a gateway).

The deactivated state S201 is followed by an activation S202 of the configuration provider CP. The transition between the states S201, S202 occurs when the configuration provider CP is activated manually or by a higher-level controller, for example.

An activation S202 is followed by an initialization S203. Within the context of the initialization S203, a first list of known field devices L1 is loaded. The first list L1 can be previously stored in a persistent storage.

The initialization S203 is followed by a beacon activation S204. The beacon activation S204 activates a recurring provider-available broadcast S205.

The recurring provider-available broadcast S205 comprises a recurring sending of an introducing message paBDOB (Provider Available Bürkert Data Object Broadcast) from the configuration provider CP to the field devices FD A to FD X of the process control system 1, in order to introduce the configuration provider CP to the field devices FD A to FD X. The introducing message paBDOB is a message to all field devices, a so-called broadcast message. The period of time between two successive introducing messages paBDOB can be reasonably between about one second and about one hour. Advantageously, the period of time between two consecutive introducing messages paBDOB is about five seconds to about five minutes, in particular about ten to forty seconds, or twenty to thirty seconds. The recurring provider-available broadcast S205 is performed as long as the configuration provider CP is activated.

In the course of the beacon activation S204, after the first sending of the provider-available broadcast S205, a registration request rBDOB (Retrigger Bürkert Data Object Broadcast) can optionally be sent from the configuration provider CP to the field devices FD A to FD X in order to trigger a registration of all field devices FD A to FD X with the configuration provider CP. The registration request rBDOB is a message to all field devices, a so-called broadcast message. By sending the registration request rBDOB, it can be ensured that the information regarding the field devices FDA to FD X in the process control system 1 (in particular the second list L2) of the configuration provider CP is consistent even if, for example, the configuration provider CP has been restarted. In this case, without the optional registration request rDBOB, the field devices which had already registered with the configuration provider CP before the restart thereof would otherwise not register again. The second list L2 would then possibly be incomplete without the registration requirement rBDOB.

The beacon activation S204 is followed by a waiting and registration cycle S207. In the waiting and registration cycle S207, the configuration provider CP waits (in particular a defined period of time) for the field devices FD A to FD X to register with the configuration provider CP using a registration message rMSG in response to an introducing message paBDOB. The defined period of time can advantageously be equal to or shorter than the period of time between two successive introducing messages paBDOB.

As long as no new field devices FD A to FD X register with the configuration provider CP in the waiting and registration cycle S207 and do not make known any changes to their configuration data (condition C211), the configuration provider CP remains in the waiting and registration cycle S207 or restarts the waiting and registration cycle S207 recurrently. The waiting and registration cycle S207 can therefore be regarded as a basic state of the configuration provider CP. At or before the start of the first waiting and registration cycle S207, a second list L2 for entries with the identification data of active field devices (empty) is created or emptied. The field devices FD A to FD X, which register with the configuration provider CP during the waiting and registration cycle S207, are entered by the configuration provider CP in the second list L2 with the active field devices. No field devices are entered more than once if they report more than once in the waiting and registration cycle S207.

If (at least) one new field device FD F, FD X registers with the configuration provider CP (condition C212) in the waiting and registration cycle S207, a registration re-triggering S208 is performed. A new field device is a field device FD F, FD X the identification data of which is not listed in the second list L2. The new field devices FD F, FD X (or the identification data thereof) are then entered in the second list L2. The registration re-triggering S208 involves the sending of a registration request rBDOB (Retrigger Bürkert Data Object Broadcast) from the configuration provider CP to the field devices FD A to FD X to trigger a re-registration of all field devices FD A to FD X with the configuration provider CP. The registration request rBDOB is a message to all field devices, a so-called broadcast message.

The registration retriggering S208 is followed by a further waiting and registration cycle S209. The further waiting and registration cycle S209 substantially corresponds to the waiting and registration cycle S207. At the beginning of the further waiting and registration cycle S209, the second list L2 is emptied or alternatively a new list is created (empty). The second list L2 is then re-created with the identification data of the field devices FD A to FD X registering with the configuration provider CP in response to the registration request with a registration message rMSG (a Bürkert Data Object). In the second list L2, entries with the identification data of the respective field devices are created. No field devices are entered more than once if they report more than once in the further waiting and registration cycle S209. Due to the re-creation of the second list L2, the second list L2 does not contain any field devices that have been removed from the process control system 1 and/or are not (no longer) active.

If one of the field devices FD A to FD X has informed the configuration provider CP of a change of its configuration data in the waiting and registration cycle S207 (condition C213), or if a new field device FD F, FD X has registered with the configuration provider CP (condition C212), the first list L1 and the second list L2 are compared with each other in a list comparison S210.

Using the list comparison S210, field devices missing from the configuration provider CP (e.g. field device FD D in FIG. 1b and FIG. 1c), exchange field devices (e.g. field device FD X in FIG. 1d), unknown field devices (e.g. field device FD F in FIG. 1b and FIG. 1e) or field devices with changed configuration data, as well as known field devices (e.g. field devices FD A to FD C in FIG. 1a to FIG. 1e) are recognized (conditions C221 to C224), and a corresponding action S221 to S224 is performed for each of the field devices (C241).

A field device is recognized as a new field device (conditions C212) if a corresponding entry is missing in the second list L2.

A field device is recognized as an unknown field device (condition C222) if a corresponding entry is missing in the first list L1. For linguistic simplification, an unknown field device can also be referred to as a new field device.

A field device FD D is recognized as a missing field device (conditions C223 and C224) if a corresponding entry exists in the first list L1 and is missing in the second list L2.

A field device is recognized as a field device with changed configuration data (condition C222) if the field device notifies the configuration provider of a change in the configuration data, or if the configuration provider recognizes a change in the configuration data by comparing provisioned configuration data and current configuration data of the field device.

A field device FD X is recognized as an exchange field device (condition C223) if it is a new field device and at the same time a compatible field device FD D of the same device class (a field device having the same ident number) is missing in the process control system 1. For an exchange S212, the exchange field device FD X is automatically configured by the configuration provider with the configuration data of the replaced FD D field device. The entry of the replaced field device FD D in the first list L1 is updated with the identification data of the exchange field device FD X. In the corresponding entry in list L1, the serial number SNR of field device FD D is overwritten with the serial number SNR of field device FD X. The serial number SNR of field device FD D is overwritten.

If a field device FD A to FD C is already known and the configuration provider already provisions associated current configuration data (condition C221), the configuration provider CP sends a confirmation message okMSG to the field device for confirmation S214.

If a field device FD F is an unknown field device but not an exchange field device or has changed configuration data (condition C222), the configuration provider initiates a backup S211 of the configuration data from the field device. An entry is also created with the identification data of the field device FD F in the first list L1.

If a known field device is missing without a corresponding exchange field device being available (condition C224), a maintenance message S213 is output. The maintenance message can be output via the communication system 2 or via a signal transmitter (display, color display, acoustic signal transmitter, etc.) on the corresponding field device. The maintenance message can be classified according to NAMUR and, for example, signaling the maintenance message by a blue color display.

If the backup S211 or exchange S212 fails (condition C232), a maintenance message S213 is output.

If the backup S211 or the exchange S212 was carried out successfully (condition C231), the configuration provider CP sends a confirmation message okMSG to the field device for confirmation S214.

If the configuration provider CP has performed the comparison of the lists L1, L2 for all active and/or known field devices (condition C242), the configuration provider returns to its basic state, the waiting and registration cycle S207, after confirmation S214.

In an alternative embodiment (without Fig.), no existing entries in the first list L1 are changed/overwritten by the configuration provider CP. Rather, for all field devices that have ever been connected with the bus system, entries with the identification data and the associated backup (configuration data) are stored. In this case, missing or removed field devices FD D in the process control system 1 cannot be identified by comparing the first list L1 with the second list L2. It would be appropriate to detect missing power supply units using corresponding heartbeat routines.

Figure 3:
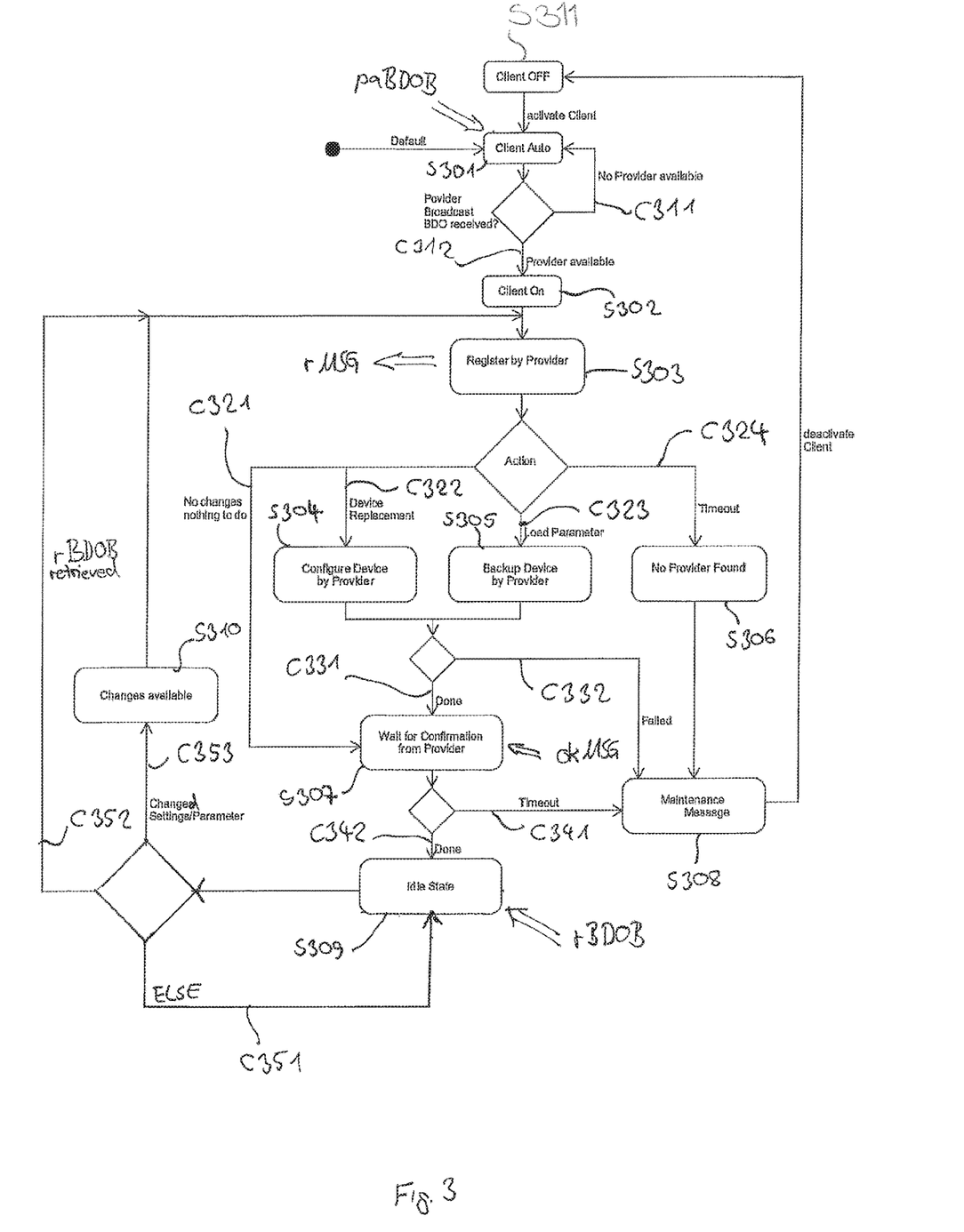
FIG. 3 shows a simplified state diagram of a configuration agent of a field device.

FIG. 3 shows a simplified state diagram of a configuration agent (client) of a field device FD A to FD X. The steps of the method according to the invention are grouped into successive states ("States", prefix S3xx) and described in the context of these states. Usually, a first state is followed by exactly one second state. In alternatives, the second state is selected from a limited number of predetermined states depending on the fulfillment of a condition ("Conditionals", prefix C3xx).

In summary, each field device FD A to FD X is configured in the "Client Auto" state in the delivery state (factory state, default). In this state, in case the field device is integrated into a process control system and connected to other field devices via a bus 2, it displays the message "no backup" (e.g. NAMUR color blue) and waits until a configuration provider CP responds. A configuration provider CP that is connected with the bus system 2 and is active reports at short intervals to all field devices FD A to FD X that are connected with bus system 2. To this end, it sends a broadcast to all participants of the bus system 2. The field devices FD A to FD X, which are connected to the bus system 2, register with the configuration provider CP. This means they reply with their identification (IDNR and SNR) and then wait a predefined time for an action triggered by the configuration provider CP. On the one hand, the actions include the "backup" of the configuration data, i.e. the request, retrieval and storage of the configuration data by the configuration provider CP and the provision of the configuration data by the field device FDA to FD X itself. On the other hand, these actions include the "import" of new/changed configuration data, i.e. the transfer of configuration data from the configuration provider CP to the field device FD X and the processing/storage of the transferred configuration data on the field device FD X. If no action takes place within a specified time (timeout), a maintenance message (NAMUR color blue) is displayed on the field device. The field device cannot leave this state without user input or maintenance. It is deactivated. The field device is then in the "Client off" state, and maintenance must take place.

In an initial state S301, the configuration agent of the field device FD A to FD X is in a standby state S301.

The configuration agent is designed to receive and evaluate messages, in particular (undirected) messages to all field devices, in a standby state S301. If, in a standby state S301, the configuration agent receives an introducing message paBDOB from a configuration provider CP (condition C312) indicating that the configuration agent CP is available in the process control system 1, the configuration agent changes to a switched-on state S302. As long as the configuration agent has not yet received an introducing message paBDOB (condition C311), it remains in the standby state S301.

After the switching-on S302, the configuration agent tries to register itself or the field device FD A to FD X with the configuration provider CP, S303. To this end, the configuration agent sends a registration message rMSG to the configuration provider CP.

The registration message rMSG comprises identification data of the field device, in particular an ident number and a serial number.

The ident number is a data value that describes a function-based device class of the field device. In other words, the ident number describes a functionality (for example, Mass Flow Controller MFC) of the field device. Field devices having the same ident number are interchangeable with regard to their functionality in the process control system 1. However, field devices having the same ident number are not necessarily identical in construction. In other words, devices of a device class all have the same basic functions, but may differ in device configuration (software or hardware configuration, such as firmware and software version, display, wireless interface, specific connectors, or housings for specific protection classes, etc.). The serial number is nonrecurring within a device class. The identification data can already be assigned to the field devices during production.

The identification data may include additional information such as software and/or hardware versions, a date of last configuration change and/or a hash value formed from the current configuration data of the field device.

After the registration attempt S303, the configuration agent waits a predetermined period of time for an action of the configuration provider CP. If the configuration provider CP does not initiate an action within the predetermined period of time (condition C324), the configuration agent determines the unavailability of the configuration provider CP, S306. In this case, the configuration agent outputs a maintenance message, S308. The maintenance message can be output via the communication system 2 or via a signal transmitter (display, color display, acoustic signal transmitter, etc.) on the corresponding field device. The maintenance message can be classified according to NAMUR and, for example, signal the maintenance message by a blue color display.

The action can be the triggering of a configuration S304 of the field device if the field device is an exchange field device FD X (condition C322).

The action can be the triggering of a backup S305 of the configuration data of the field device if the configuration provider CP does not yet provision the configuration data (condition C323), i.e. if the field device is an unknown field device for the configuration provider (condition C222).

If the backup of the configuration data S305 or the configuration of the field device S304 is successfully completed (condition C331), and the configuration provider CP confirms this with a confirmation message okMSG (condition C342), the configuration agent changes to a basic state S309.

The action can be a transmission of a confirmation message okMSG. If the configuration provider CP already provisions a current version of the configuration data of the field device (condition C321), the configuration provider CP sends the configuration agent a confirmation message okMSG, for which the configuration agent is waiting, S307. If the configuration agent receives the confirmation message okMSG from the configuration provider CP within a predetermined period of time (condition C342), the configuration agent switches to the basic state S309.

If the backup of the configuration data S305 or the configuration of the field device S304 fails (condition C332), or the configuration provider CP does not confirm the successful completion of the backup S305 or the configuration S304 in time with a confirmation message okMSG (condition C341), the configuration agent outputs a maintenance message, S308. The maintenance message can be output via the communication system 2 or via a signal transmitter (display, color display, acoustic signal transmitter, etc.) on the corresponding field device. The maintenance message can be classified according to NAMUR and, for example, signal the maintenance message by a blue color display.

After the configuration agent or the field device has output the maintenance message, S308, the configuration agent deactivates itself automatically. The configuration agent is then switched off S311. The configuration agent does not switch back to the standby mode S301 before it is reactivated, for example within the context of a maintenance.

In the basic state S309, the configuration agent is set up to monitor the configuration data of the field device for changes and to receive and evaluate a registration request rBDOB.

As long as the configuration agent does not receive a registration request rBDOB from the configuration provider or detects a change in the configuration data (condition C351), the configuration provider remains in the basic state S309.

When the configuration agent receives a registration request rBDOB from the configuration provider (condition C352), the configuration agent switches from the basic state S309 back to the registration attempt S303 and sends a registration message rMSG to the configuration provider CP to register therewith.

If the configuration agent detects a change in the configuration data of the field device (condition C353), for example through a reconfiguration of the field device (e.g. at the field device or by a higher-level controller), S310, the configuration provider leaves its initial state S309 and returns again to the registration attempt S303 to register the field device with the configuration provider CP using the changed configuration data. The registration with the configuration provider CP is done by a registration message rMSG. The registration message rMSG can contain information about the changed configuration data of the field device.

The FIG. 4a to FIG. 4e show a sequential simplified schematic representation of a first list L1 and a second list L2 of the configuration provider CP from the process control system 1 shown in the FIG. 1a to FIG. 1e 1.

It should be noted that FIG. 1a to FIG. 1e represent the physical changes, i.e. the integration and removal of field devices FD F, FD D and FD X of the process control system 1, while FIG. 4a to FIG. 4e show the states of the first list L1 and the second list L2 in the course of the method according to the invention.

The first list L1 comprises entries with the identification data of known field devices, and the second list L2 comprises entries with the identification data of active field devices in the process control system 1. The identification data comprise an ident number IDNR and a serial number SNR. The ident number IDNR designates a device class of the field device (e.g. Mass Flow Controller, MFC). Field devices having the same ident number IDNR are basically functionally interchangeable. To actually perform the same function in the process control system 1, the field devices must also be configured identically for this purpose. This applies in particular to exchange field devices FD X, i.e. field devices that have been integrated into the process control system 1 as a replacement for another (missing) FD D field device. The serial number SNR is nonrecurring within the respective device class (assigned only once). The serial number SNR must be distinguished from a "hardware serial number" of the field devices. Field devices of a device class all have the same basic functions, but may differ in the device configuration (software or hardware configuration such as firmware, software version or device with display, wireless interface, specific connections, or housing for specific protection classes, etc.).

For a better understanding, the field devices FD A to FD X of the process control system 1 are designated according to their functionality A to X. The "functional" designations A to F are for explanatory purposes only. The field device FD A has the ident number IDNR "I" and the serial number SNR "1". The field devices FD B, FD C and FD D are all field devices of the same device class and have the ident number IDNR "II". The field device FD B has the serial number SR "1", the field device FD D the serial number SNR "2" and the field device FD C the serial number SNR "3". The field device FD F has the ident number IDNR "III" and the serial number SNR "7". The field device FD X has the ident number IDNR "II" and the serial number SNR "4". After the field device FD X has been configured with the configuration data of the field device FD D, it is called FD D according to its function.

Figure 4A:
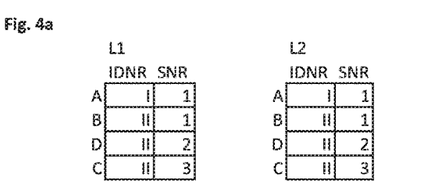
FIG. 4a to FIG. 4e show sequential simplified schematic representations of a first list and of a second list of the configuration provider of FIG. 1a to FIG. 1e.

The state of the first and second lists L1, L2 in FIG. 4a corresponds to the state of the process control system 1 shown in FIG. 1a, when the method according to the invention has been run through and the configuration provider CP is again in the basic state S207. The first list L1 and the second list L2 respectively contain entries for the field devices FD A to FD D.

Figure 4B:
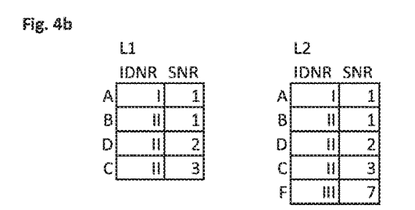

The state of the first and second lists L1, L2 in FIG. 4b corresponds to the state of the process control system 1 shown in FIG. 1b, when the method according to invention has been partially run through and the second list L2 has been recreated in the further waiting and registration cycle S209. The second list L2 contains entries for the field devices FD A to FD F. A list comparison S210 has not yet been performed. The first list L1 has therefore not yet been updated and contains entries for the field devices FD A to FD D.

In summary, a new field device FD F was connected to the bus system in FIG. 1b. FD F is in a standby state S301 and is waiting for an introducing message paBDOB. Upon reception of this message, FD F switches to the "Client On" state and registers with the configuration provider CP by sending its identification data (IDNR III/SNR 7) to the configuration provider CP. CP enters device class "III" and serial number "7" in the second list L2 with active field devices. In the first list L1 the configuration provider CP does not find any suitable entry for device class "III". FIG. 4b shows that the configuration provider CP does not yet know a field device of device class "III". The field device FD F is therefore a new field device for the configuration provider CP. The configuration provider CP now enters the tuple "III" and "7" for the new field device in the first list L1 (FIG. 4c) and obtains a backup ("Action" Backup) from FD F.

Figure 4C:
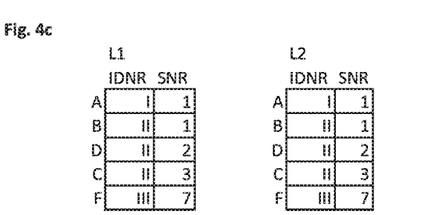

The state of the first and second lists L1, L2 in FIG. 4c corresponds to the state of the process control system 1 shown in FIG. 1b, when the method according to the invention has been run through and the configuration provider CP returns to the basic state S207. A backup S211 of the configuration data of the new field device FD F was carried out according to the method. The identification data of the new field device FD F was added to the second list L2. The first and second lists L1, L2 now include entries for the field devices FD A to FD F.

The state of the first and the second list L1, L2 in FIG. 4c also corresponds to the state of the process control system 1 shown in FIG. 1c. The configuration provider CP is still in the basic state S207. The removal of the field device FD D from the process control system 1 has not yet been registered by the configuration provider CP. It is immediately obvious that a field device can no longer communicate with the configuration provider CP if, for example, it is defective or has been removed from the process control system 1. The field device FD D cannot therefore actively communicate its distance/absence from the process control system. Only the absence of a message from the field device FD D expected by the configuration provider CP could lead the configuration provider CP to conclude that the field device FD D is absent or unavailable. Such monitoring could optionally be implemented via a heartbeat function. To do this, the field devices would have to inform the configuration provider CP regularly about their operational readiness for operation. If this notification was not received from one of the field devices, the configuration provider CP could conclude the non-availability (for example, the defect or absence) of the corresponding field device. In the present case, the use of such heartbeat functionality is possible, but not mandatory. Finally, the purpose of the configuration provider CP is to configure exchange field devices automatically. For the detection of a field device exchange, however, it is sufficient if the missing field device FD D is only detected in connection with the new field device FD X.

Figure 4D:
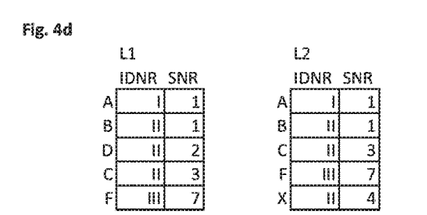

The state of the first and of the second list L1, L2 in FIG. 4d corresponds to the state of the process control system 1 shown in FIG. 1d. After the field device FD X has registered with the configuration provider CP, the latter recognized the field device FD X as a new field device and triggered a new registration S303 of all field devices FD A to FD X with the configuration provider CP with a registration request rBDOB. The second list L2 was recreated in the further waiting and registration cycle S209. The removed field device FD D is now missing in the second list L2, the new field device FD X has been added to the second list L2. The list comparison S210 has not yet been performed. The first list L1 has therefore not yet been updated. The first list L1 includes entries for the field devices FD A to FD F. The second list L2 includes entries for the field devices FD A to FD C, FD F and FD X.

Figure 4E:
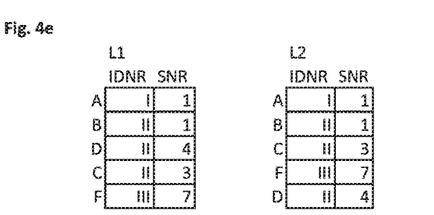

The state of the first and of the second list L1, L2 in FIG. 4e corresponds to the state of the process control system 1 shown in FIG. 1e, when the method according to the invention has been run through and the configuration provider CP is in the basic state S207 again. During the list comparison S210, it was recognized that the new field device FD X and the missing field device FD D have the same IDNR and therefore belong to the same device class II. The new field device FD X was therefore automatically configured by the configuration provider CP using the provisioned configuration data of the missing field device FD D, S212/S304. The new field device FD X now completely takes over the function of the field device FD D and is therefore from now on referred to as FD D. The corresponding entry with the identification data of the missing field device FD D in list 1 has been replaced with the identification data of the replacement field device FD D. In the corresponding entry, the serial number SNR of the entry was in particular changed from "2" (the serial number SNR of the old field device FD D) to "4" (the serial number of the new field device FD D). The first list L1 and the second list L2 thus contain entries for the field devices FD A to FD C, FD D and FD F.

Figure 5:
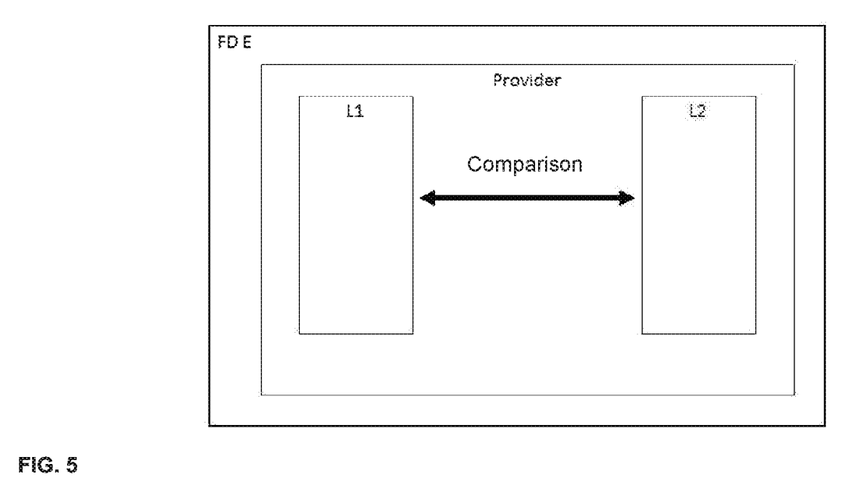
FIG. 5 is a simplified schematic representation of a configuration provider.

FIG. 5 shows a simplified schematic representation of a field device FD E. The field device FD E is designed as a configuration provider CP. The field device FD E has corresponding functions implemented in the software. The configuration provider CP is designed to provision and maintain a first list L1 and a second list L2. The configuration provider CP is designed to compare the first list L1 and the second list L2. The configuration provider CP is designed to provision corresponding configuration data for the field devices in the first list L1. The configuration provider CP is designed to execute the method according to the invention together with one or more field devices FD A to FD X.

The invention claimed is:

1. A method for automatic configuration of a first field device in a process control system, the process control system comprising one or more field devices and a configuration provider, and the field devices and the configuration provider being communicatively coupled via a communication system, the method comprising the following steps:
recurrently sending an introducing message from the configuration provider to the field devices to introduce the configuration provider to the field devices, wherein the introducing message is a broadcast message;
registering the field devices with the configuration provider, the registering comprising sending a message from the respective field device to the configuration provider subsequent to having received the introducing message of the configuration provider, wherein the message of a respective field device comprises identification data of the respective field device;
identifying by the configuration provider a new field device;
sending a registration request from the configuration provider to the field devices in response to identifying the new field device, wherein the registration request is a broadcast message, and wherein a new field device is a field device which sent a message to the configuration provider comprising identification data which were unknown to the configuration provider before having received that message;
provisioning and maintaining a first list of identification data of known field devices, the known field devices include field devices which are currently registered and field devices which were in the past registered with the configuration provider;
provisioning and maintaining configuration data which belongs to the known field devices of the first list;
provisioning and maintaining a second list of identification data of active field devices, the active field devices being such field devices which are currently registered with the configuration provider regardless of being past registered with the configuration provide;
automatically recognizing the first field device via the configuration provider after removal of a second field device from the process control system and replacement with the first field device, the automatically recognizing comprises automatically recognizing the new field device as the first field device and a missing field device as the second field device based on comparison of the first list and the second list, wherein, the new field device and the missing field device belong to a common device class and no other new field device and missing field device belong to the common device class;
automatically retrieving and provisioning configuration data of the second field device from the registered field devices via the configuration provider; and
automatically configuring the first field device using the provisioned configuration data of the second field device via the configuration provider.

2. The method according to claim 1, the method further comprising:
filling the second list with the identification data of the field devices registering with the configuration provider.

3. The method according to claim 1, the method further comprising:
recompiling or emptying the second list.

4. The method according to claim 1, the method comprising one or more, or all of the following steps:
comparing the first list with the second list to recognize the missing field device if the associated identification data is present only in the first and not in the second list; and
comparing the second list with the first list to recognize the new field device if the associated identification data is present only in the second list and not in the first list.

5. The method according to claim 4, the method comprising one or more, or all of the following steps:
transmitting the configuration data of the second field device provisioned by the configuration provider to the first field device;
configuring the first field device using the configuration data transmitted to the first field device; and
replacing the identification data of the second field device in the first list with the identification data of the first field device.

6. The method according to claim 1, the method comprising one or more, or all of the following steps:
- transmitting configuration data from a new field device to the configuration provider;
- transmitting configuration data from a field device to the configuration provider after the update/change of the configuration data on the field device;
- provisioning the configuration data transmitted to the configuration provider in a local storage of the configuration provider or in a remote/distributed storage; and
- inserting the identification of the new field device in the first list.

7. A configuration provider for automatic configuration of a first field device in a process control system having one or more field devices, the configuration provider includes local storage to store configuration data of the field devices and is configured to be communicatively coupled to the field devices via a communication bus, and the configuration provider is configured to:
- recurrently send an introducing message to the field devices to be introduced to the field devices, wherein the introducing message is a broadcast message;
- register field devices which answer the configuration provider by sending a message, wherein the message comprises identification data of a respective field device;
- send a registration request from the configuration provider to the field devices if the configuration provider identifies a new field device, wherein the registration request is a broadcast message, and wherein a new field device is a field device which sent a message to the configuration provider comprising identification data which were unknown to the configuration provider before having received that message;
- provision and maintain a first list of identification data of known field devices, the known field devices include field devices which are currently registered and field devices which were in the past registered with the configuration provider;
- provision and maintain configuration data belonging to the known field devices of the first list;
- provision and maintain a second list of identification data of active field devices, the active field devices being such field devices which are currently registered with the configuration provider regardless of being past registered with the configuration provider;
- automatically recognize the first field device after removal of a second field device from the process control system and replacement with the first field device, the automatically recognize comprises automatically recognize the new field device as the first field device and a missing field device as the second field device based on comparison of the first list and the second list, wherein the new field device and the missing field device belong to a common device class and no other new field device and missing field device belong to the common device class;
- automatically retrieve and provision configuration data of the second field device from registered field devices; and
- automatically configure the first field device using the provisioned configuration data of the second field device.

8. The configuration provider according to claim 7, wherein the configuration provider is configured to:
- fill the second list with the identification data of the field devices which register with the configuration provider; and/or
- compile or empty the second list if the field devices were requested by a registration request to register with the configuration provider; and/or
- compare the first list with the second list to recognize a missing field device; and/or
- compare the second list with the first list to recognize a new field device; and/or
- transmit the provisioned configuration data of the second field device into the first field device; and/or
- configure the first field device using the configuration data transmitted into the first field device; and/or
- replace the identification data of the second field device in the first list with the identification data of the first field device; and/or
- retrieve configuration data from a field device, provisioned that the field device is a new field device and the new field device does not replace a missing field device; and/or
- retrieve configuration data from a field device, provisioned that the field device has previously signalized to the configuration provider that the configuration data has changed; and/or
- provision the retrieved configuration data in the local storage of the configuration provider or in a remote/distributed storage; and/or
- insert the identification data of a new field device into the first list; and/or
- assign the corresponding provisioned configuration data to the identification data in the first list.

9. A system comprising:
a configuration provider for automatic configuration of a first field device in a process control system having one or more field devices, the configuration provider is communicatively coupled to the field devices via a communication system, and the configuration provider is configured to:
- recurrently send an introducing message to the field devices to be introduced to the field devices, wherein the introducing message is a broadcast message;
- register field devices which answer the configuration provider by sending a message in response to receiving the introducing message, wherein the message comprises identification data of a respective field device;
- send a registration request from the configuration provider to the field devices if the configuration provider identifies a new field device, wherein the registration request is a broadcast message, and wherein a new field device is a field device which sent a message to the configuration provider comprising identification data which were unknown to the configuration provider before having received that message;
- provision and maintain a first list of identification data of known field devices, the known field devices include field devices which are currently registered and field devices which were in the past registered with the configuration provider;
- provision and maintain configuration data belonging to the known field devices of the first list;
- provision and maintain a second list of identification data of active field devices, the active field devices being such field devices which are currently registered with the configuration provider regardless of being past registered with the configuration provider;

automatically recognize the first field device after removal of a second field device from the process control system and replacement with the first field device, the automatically recognize comprises automatically recognize the new field device as the first field device and a missing field device as the second field device based on comparison of the first list and the second list, wherein the new field device and the missing field device belong to a common device class and no other new field device and missing field device belong to the common device class;

automatically retrieve and provision configuration data of the second field device from the registered field devices'; and automatically configure the first field device using the provisioned configuration data of the second field device; and the one or more field devices, each of the field devices having a configuration agent and configured, via the configuration agent, to:

transmit configuration data to the configuration provider, receive configuration data from the configuration provider, be configured using the received configuration data from the configuration provider, receive an introducing message from the configuration provider, wherein the introducing message is a broadcast message, and send a message to the configuration provider to register with the configuration provider, wherein the message comprises identification data of the field device.

* * * * *